United States Patent
Kwak et al.

(10) Patent No.: US 8,254,673 B2
(45) Date of Patent: Aug. 28, 2012

(54) APPARATUS AND METHOD OF COLOR CONVERTING A DOMINANT COLOR

(75) Inventors: Young-shin Kwak, Suwon-si (KR); Ji-young Hong, Seongnam-si (KR); Gun-woo Nam, Seongnam-si (KR); Du-sik Park, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1023 days.

(21) Appl. No.: 11/837,879

(22) Filed: Aug. 13, 2007

(65) Prior Publication Data
US 2008/0144929 A1     Jun. 19, 2008

(30) Foreign Application Priority Data
Dec. 13, 2006    (KR) .................. 10-2006-127296

(51) Int. Cl.
  G06K 9/00     (2006.01)
  G06K 9/40     (2006.01)
(52) U.S. Cl. ............... 382/167; 382/162; 382/274
(58) Field of Classification Search ............ 382/162
  See application file for complete search history.

(56) References Cited

U.S. PATENT DOCUMENTS

| | | | |
|---|---|---|---|
| 6,463,172 B1 * | 10/2002 | Yoshimura | 382/162 |
| 2003/0002736 A1 * | 1/2003 | Maruoka et al. | 382/168 |
| 2004/0114798 A1 | 6/2004 | Park et al. | |
| 2005/0163369 A1 | 7/2005 | Jyou et al. | |
| 2008/0025600 A1 * | 1/2008 | Nam et al. | 382/167 |
| 2008/0075360 A1 * | 3/2008 | Li et al. | 382/155 |

FOREIGN PATENT DOCUMENTS

| | | |
|---|---|---|
| JP | 10-75458 | 3/1998 |
| JP | 10-301948 | 11/1998 |
| JP | 2000-149018 | 5/2000 |
| JP | 2001-223911 | 8/2001 |
| JP | 2004-23177 | 1/2004 |
| KR | 1995-27622 | 10/1995 |
| KR | 1999 48313 | 6/2000 |
| KR | 2002-62557 | 7/2002 |
| KR | 2004-53500 | 6/2004 |
| KR | 2006-93821 | 8/2006 |

OTHER PUBLICATIONS

Choe et al. "High Quality Image Processing for Mobile Displays," Samsung Journal of Innovative Technology. vol. 2, No. 1, Feb. 2006 pp. 119-130.
U.S. Appl. No. 11/837,894, filed Aug. 13, 207, Kwak et al., Samsung Electronics Co., Ltd.

* cited by examiner

*Primary Examiner* — Bhavesh Mehta
*Assistant Examiner* — Nirav G Patel
(74) *Attorney, Agent, or Firm* — Staas & Halsey LLP

(57) ABSTRACT

An apparatus and method of reproducing a preferred color is provided. The apparatus includes a color distribution analysis module to analyze a distribution of colors in an input image, a dominant color extraction module to extract a dominant color from the input image according to a result of the analysis, a conversion domain determination module to determine a conversion domain to be processed in a color space based on a proportion of the dominant color, and a color conversion module to convert colors in the input image that belong to the conversion domain.

28 Claims, 12 Drawing Sheets

510: FIRST DOMINANT COLOR

520: SECOND DOMINANT COLOR

APPARATUS AND METHOD OF COLOR CONVERTING A DOMINANT COLOR

CROSS-REFERENCE TO RELATED APPLICATION

This application claims the benefit of Korean Application No. 2006-127296, filed Dec. 13, 2006 in the Korean Intellectual Property Office, the disclosure of which is incorporated herein by reference.

BACKGROUND OF THE INVENTION

1. Field of the Invention

Aspects of the present invention relate to reproduction of a preferred color, and more particularly, to an apparatus and method of reproducing a preferred color in which the distribution of colors in an input image is analyzed, a color space domain to be processed is determined, and a color in the determined domain to be processed is converted into another color, which may be a preferred color.

2. Description of the Related Art

Developments in imaging technology have enabled display devices to emphasize certain colors of an input image or to convert certain colors of the input image into colors preferred by a user. A related color conversion method will hereinafter be briefly described with reference to FIG. 1. As shown, when an input image is provided to a display device, the display device analyzes a distribution of colors in the input image. The results of the analysis may be represented using YCbCr color space coordinates, as shown in FIG. 1.

Hereinafter, it is assumed that the display device already has information regarding the graph illustrated in FIG. 1. FIG. 1 illustrates domain A (120) and domain B (130), which are domains in the YCbCr color space. If the results of the analysis performed by the display device indicate that a color of an arbitrary pixel of the input image belongs to domain A (120) or domain B (130), the color of the arbitrary pixel is converted into a predefined color (i.e., a preferred color).

Conventionally, colors in only one domain in a color space are converted into preferred colors. However, if a color space comprises more than one domain, (e.g., domain A (120) and domain B (130)) as illustrated in FIG. 1, the colors of pixels belonging to domain A (120) are converted, and then the colors of pixels belonging to domain B (130) are also converted.

Referring to FIG. 1, it is readily seen that domain A (120) and domain B (130) partially overlap each other by way of an overlapping area 140. In this case, if the colors of pixels belonging to domains A (120) and B (130) are converted, then the colors of pixels in the overlapping area 140 are converted at least twice to thereby be converted into colors not intended by a user, and to cause distortion of an output image or deterioration of the quality of the output image.

Therefore, it is necessary to develop techniques that enable converting of colors in one or more conversion domains in a color space subjected to color conversion (e.g., domain A (120) and domain B (130) illustrated in FIG. 1) into preferred colors, which will be to the satisfaction of a user, and to prevent distortion of an output image or deterioration of the quality of the output image, even when the conversion domains overlap each other.

SUMMARY OF THE INVENTION

Aspects of the present invention provides an apparatus and method of reproducing a preferred color in which color processing can be properly performed on an input image without causing undesired distortion of an output image or deterioration of the quality of the output image, even if a gamut of a display device comprises more than one conversion domain and the conversion domains overlap each other.

According to an aspect of the present invention, an apparatus to reproduce a preferred color includes a color distribution analysis module to analyze a distribution of colors in an input image, a dominant color extraction module to extract a dominant color from the input image according to a result of the analysis, a conversion domain determination module to determine a conversion domain to be processed in a color space based on a proportion of the dominant color, and a color conversion module to convert the colors in the input image that belong to the conversion domain.

According to another aspect of the present invention, a method of reproducing a preferred color includes analyzing a distribution of colors in an input image and extracting a dominant color from the input image according to a result of the analysis, determining a conversion domain to be processed in a color space based on a proportion of the dominant color, and converting the colors in the input image that belong to the conversion domain.

According to another aspect of the present invention, a method of reproducing a preferred color includes analyzing a distribution of colors in an input image and extracting a dominant color from the input image according to a result of the analysis, determining whether the extracted dominant color accounts for more than a predefined percentage of the input image, selecting a conversion domain regarding an accent color if the extracted dominant color is determined to account for more than the predefined percentage of the input image and selecting a conversion domain regarding a memory color otherwise, and converting the colors in the input image belong to the selected conversion domain of one of the accent color or the memory color.

According to another aspect of the present invention, a color reproducing method of a display includes determining a dominant color of an input image based on an arrangement of colors of the input image, and selectively converting colors of a conversion domain of the input image relative to a target color, wherein the conversion domain corresponds to the dominant color and is represented in a color space.

According to another aspect of the present invention, a color reproducing apparatus of a display includes a processor to determine a dominant color of an input image based on an arrangement of colors of the input image, and to selectively convert colors of a conversion domain of the input image relative to a target color, wherein the conversion domain corresponds to the dominant color and is represented in a color space, and to output the input image having the converted colors; and a display to display the input image having the converted colors.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the aspects, taken in conjunction with the accompanying drawings of which.

DETAILED DESCRIPTION OF THE EMBODIMENTS

Figure 1:
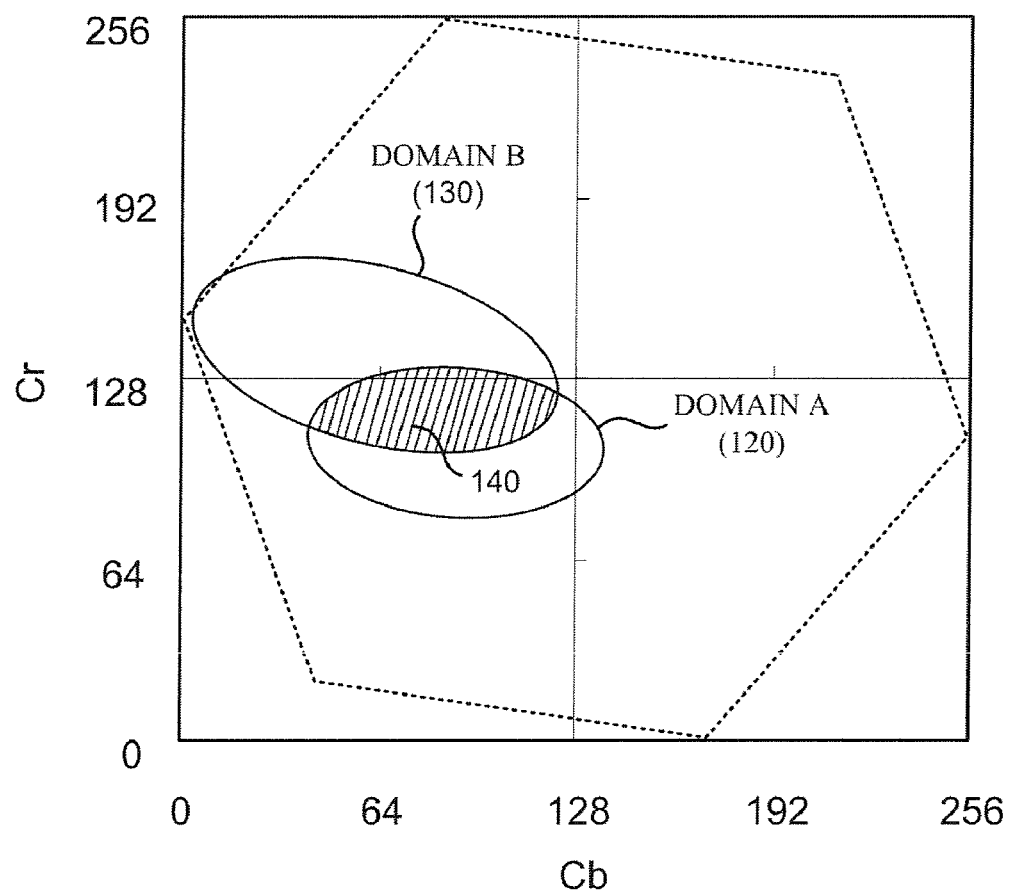
FIG. 1 is a diagram to explain a related color conversion method.

Reference will now be made in detail to the aspects of the present invention, examples of which are illustrated in the accompanying drawings, wherein like reference numerals refer to the like elements throughout. The aspects are described below in order to explain the present invention by referring to the figures.

Aspects of the present invention are described hereinafter with reference to flowchart illustrations of user interfaces, methods, and computer program products according to various aspects. It will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create devices/methods to implement the functions specified in the flowchart block or blocks.

These computer program instructions may also be stored in a computer usable or computer-readable memory that can direct a computer or other programmable data processing apparatus to function in a particular manner, such that the instructions stored in the computer usable or computer-readable memory produce an article of manufacture including instruction devices/methods that implement the function specified in the flowchart block or blocks.

The computer program instructions may also be loaded onto a computer or other programmable data processing apparatus to cause a series of operations to be performed on the computer or other programmable apparatus to produce a computer implemented process such that the instructions that execute on the computer or other programmable apparatus provide operations to implement the functions specified in the flowchart block or blocks.

Also, each block of the flowchart illustrations may represent a module, segment, or portion of code, which comprises one or more executable instructions to implement the specified logical function(s). It should also be noted that in some alternative implementations or aspects, the functions noted in the blocks may occur out of order or in different order. For example, two blocks shown in succession may in fact be executed substantially concurrently or the blocks may be executed in the reverse order, depending upon the functionality involved.

In various aspects, a conversion domain refers to domains that are subject to color conversion. Also, a gamut refers to a set or a subset, or a complete subset of colors in a color space, for example.

Figure 2:
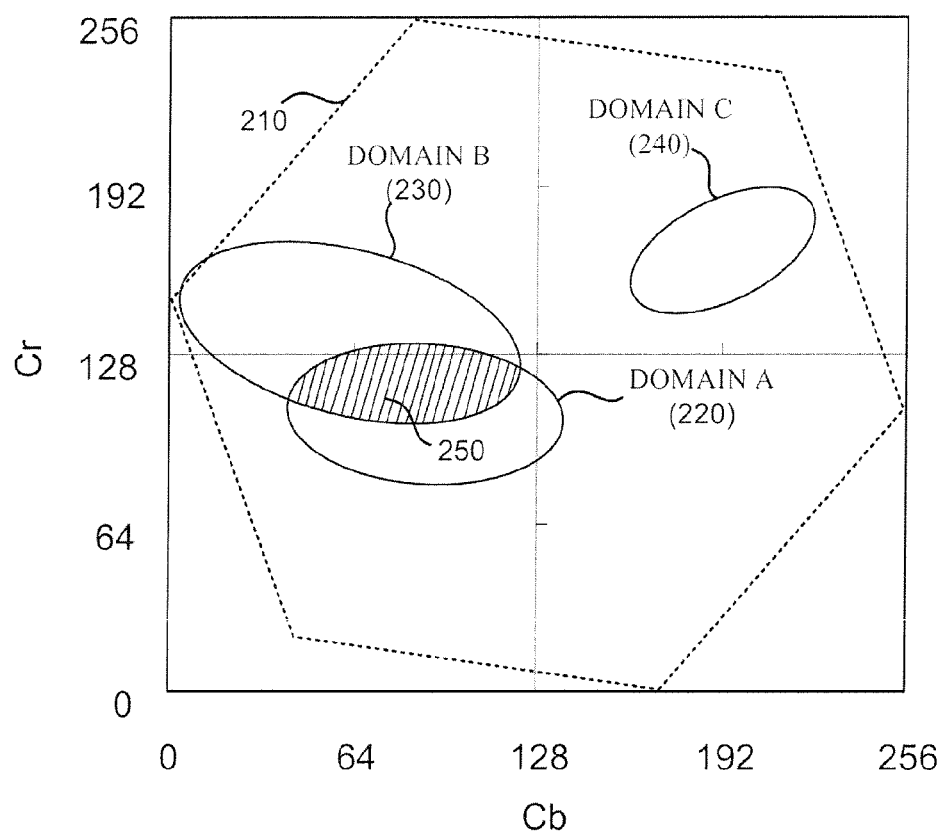
FIG. 2 is a diagram to explain an aspect of the present invention.

FIG. 2 is a diagram to explain an aspect of the present invention. As shown, a display device containing a gamut 210 of a YCbCr color space, for example, comprises three conversion domains, i.e., domain A (220), domain B (220), and domain C (240). One of domain A (220) and domain B (230) is exclusively selected according to whether an input image comprises a dominant color. That is, domain A (220) and domain B (230) are not selected at the same time. Even if domain A (220) and domain B (230) are selected at the same time, only one of domain A (220) and domain B (230) is finally selected according to an assigned priority of domain A (220) and domain B (230).

Accordingly, color processing is performed on an overlapping area 250 of domain A (220) and domain B (230) using a method that correspond to either domain A (220) or domain B (230), to thereby prevent or reduce distortion of an output image or a deterioration of the quality of the output image.

If the color of an arbitrary pixel of the input image belongs to one of domain A (220), domain B (230), and domain C (240), then the color of the arbitrary pixel is processed using a method that corresponds to whichever of domain A (220), domain B (230), and domain C (240) that includes the color of the arbitrary pixel. Accordingly, even if the color of the arbitrary pixel belongs to the overlapping area 250 of domain A (220) and domain B (230), the color of the arbitrary pixel is processed using a method that corresponds to whichever of the domain A (220) and domain B (230) that is selected.

Figure 3:
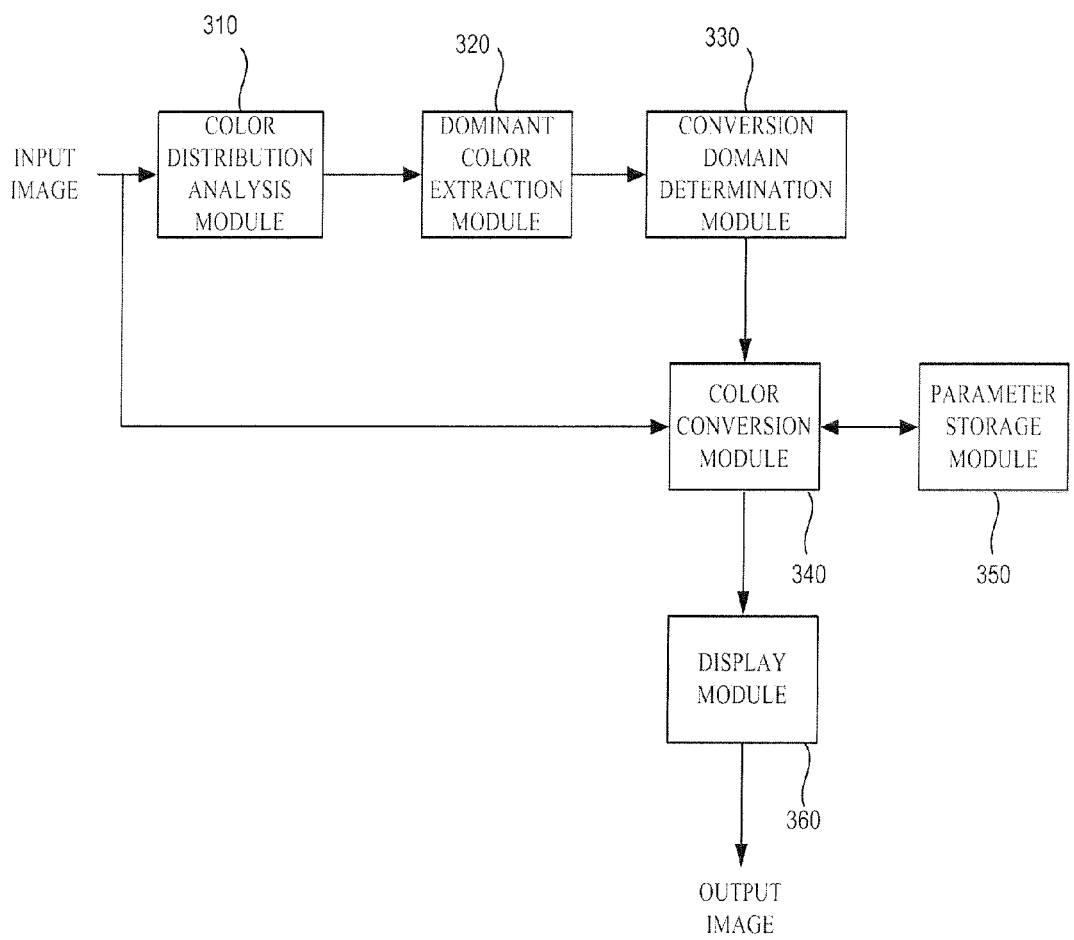
FIG. 3 is a block diagram of an apparatus to reproduce a preferred color according to an aspect of the present invention.

FIG. 3 is a block diagram of an apparatus 300 to reproduce a preferred color according to an aspect of the present invention. Referring to FIG. 3, the apparatus 300 includes a color distribution analysis module 310, a dominant color extraction module 320, a conversion domain determination module 330, a color conversion module 340, a parameter storage module 350, and a display module 360.

The color distribution analysis module 310 divides an input image into one or more zones, and analyzes color information of pixels in each of the zones. The dominant color extraction module 320 extracts a dominant color that represents each of the one or more zones of the input image according to the results of the analysis performed by the color distribution analysis module 310.

The conversion domain determination module 330 analyzes the distribution of the extracted dominant color and then determines which of the domains in the input image is to be selected for actual color converting. The color conversion module 340 converts the colors of pixels belonging to the above selected conversion domain into a predefined color or a color preferred or selected by a user.

The parameter storage module 350 stores various parameters that are needed to perform the color conversion, and the display module 360 outputs or displays a converted image obtained through the conversion performed by the color conversion module 340.

The operations of the color distribution analysis module 310, the dominant color extraction module 320, the conversion domain determination module 330, the color conversion module 340, the parameter storage module 350, and the display module 360 will hereinafter be described in further detail with reference to FIG. 4, FIGS. 5A, 5B, 5C and 5D.

Figure 4:
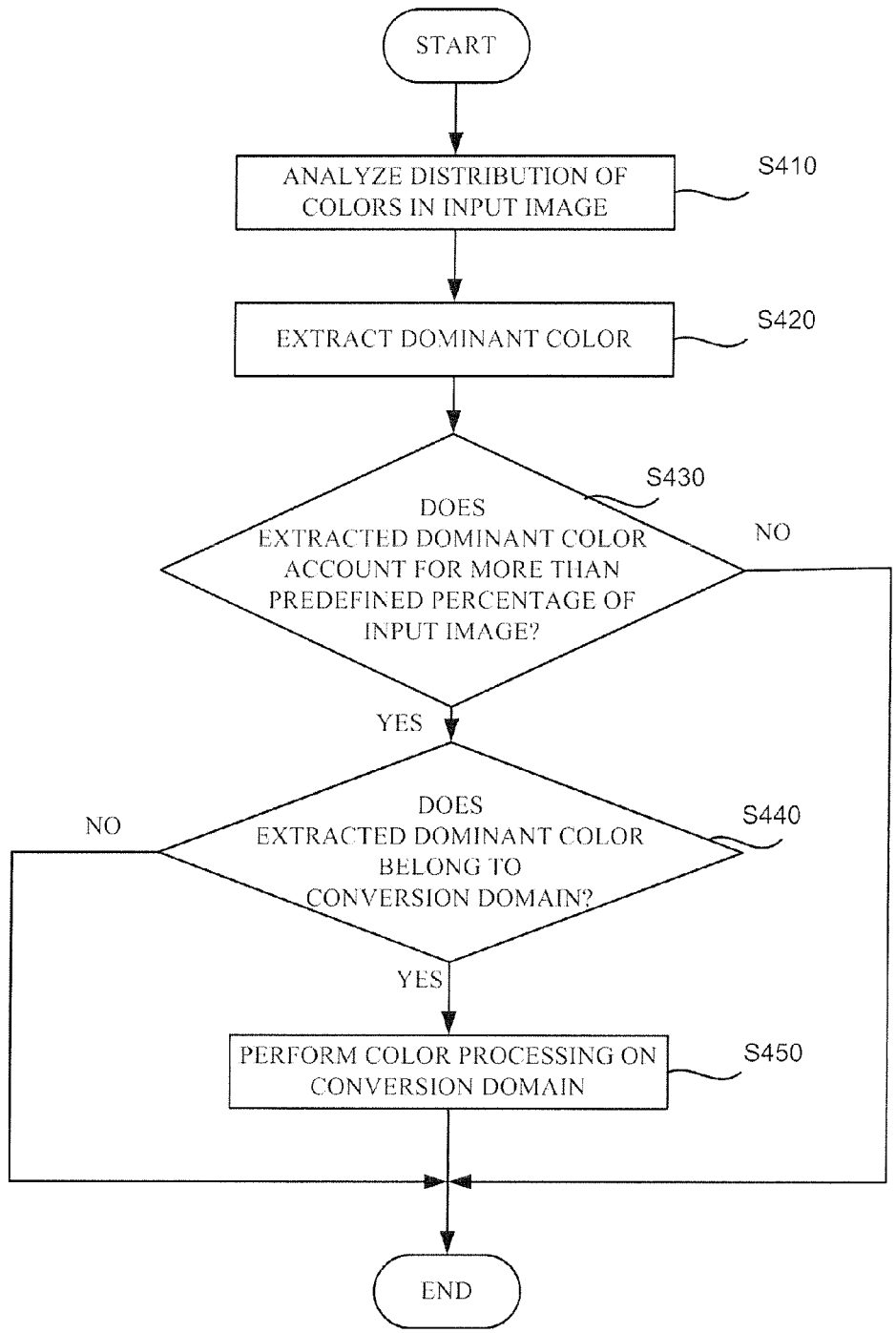
FIG. 4 is a flowchart illustrating a method of reproducing a preferred color according to an aspect of the present invention.

FIG. 4 is a flowchart illustrating a method of reproducing a preferred color according to an aspect of the present invention, while FIGS. 5A through 5D are diagrams to explain a method of analyzing an input image according to an aspect of the present invention. Referring to FIG. 4, the color distribution analysis module 310 analyzes the distribution of colors in an input image in operation S410. The dominant color extraction module 320 also extracts a dominant color of each of the lattice cells 501 in operation S420. The conversion domain determination module 330 also determines whether the extracted dominant color accounts for more than a predefined percentage of the input image in operation S430. If the determination is no, no color conversion is performed and the input image is output as is. If the determination is yes, a predefined default color conversion operation may be performed on the input image in operation S440, whereby the conversion domain determination module 330 determines whether the extracted dominant color belongs to conversion domain, which may be predefined. If the determination is no, no additional color conversion is performed on the input image to output the input image as is. If the determination is yes, the predefined default color conversion operation may be performed on the input image, whereby the color conversion module 340 performs color processing on the conversion domain of the input image.

Referring back to FIG. 4, the method of analyzing the distribution of colors in an input image of operation S410 will hereinafter be described in detail with reference to FIGS. 5A and 5B.

As shown in FIG. 4, the color distribution analysis module 310 analyzes the distribution of colors in an input image in operation S410. To perform the analysis, the color distribution analysis module 310 divides an input image into a plurality of zones or lattice cells 501, and then analyzes the distribution of the colors of pixels of the input image in order to extract a dominant color from each of the lattice cells 501, as shown in FIG. 5A. In various aspects, the color distribution analysis module 310 need not divide the input image into a lattice of rectangles, but into any shape, area, or zone, such as a triangle, a polygon, or other.

Figure 5A:
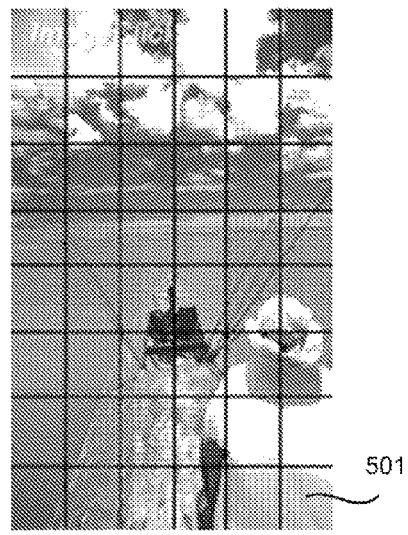
FIGS. 5A through 5D are diagrams to explain a method of analyzing an input image according to an aspect of the present invention.

In the example aspect shown in FIG. 5A, if the first lattice cell 501 comprises 400 (i.e., 20*20) pixels and the color (or grayscale) of each of the pixels is represented by one number between 0 and 255, the colors of the 400 pixels can be represented (or distributed) on a color scale that comprises an arbitrary number of sections representing different levels of the color scale. In the aspect shown in FIG. 5B, six sections respectively represent first through sixth levels of the color scale. In this manner, a color histogram of the input image based on the color of the constituent pixels can be obtained.

The distribution of the colors of the pixels of the input image can be analyzed using the color histogram of the input image. If the input image is a Red-Green-Blue (RGB) image, the input image may be converted into a Lightness-Chroma-Hue (LCH) image, and then statistical analysis regarding the hue (H) is performed, for example, though not required. In the aspect shown, the color of each of the pixels is represented by 8 bit data to produce 256 possible colors or representations thereof. Nevertheless, it should be understood that in other aspects, the color of each of the pixels may be represented by any bit number data to produce a corresponding number or representations of colors. Also, in the aspect shown, a six level color scale is shown. Nevertheless, it should be understood that in other aspects, any number color scale is within the scope of the invention.

As shown in FIG. 4, the dominant color extraction module 320 extracts a dominant color of each of the lattice cells 501 in operation S420, which will be described in detail with reference to FIG. 5C. In the aspect shown, the lattice cells 501 of FIG. 5C correspond to the lattice cells 501 of FIG. 5A. Referring to FIG. 5C, a number in each lattice cell 501 indicates a dominant color level described above with reference to FIG. 5B.

Figure 5B:
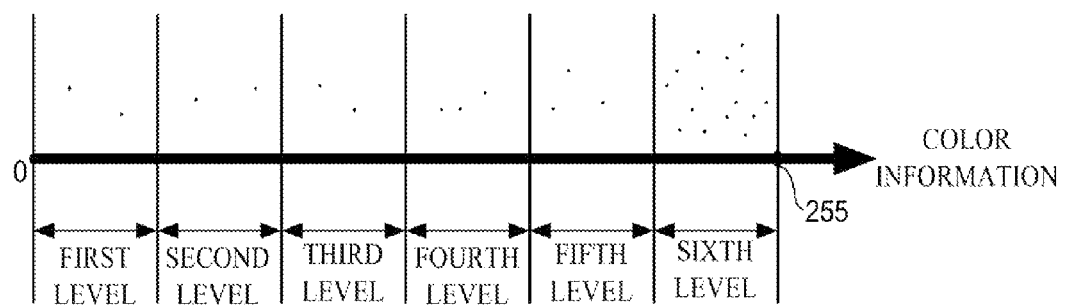
Figures 5C, 5D:
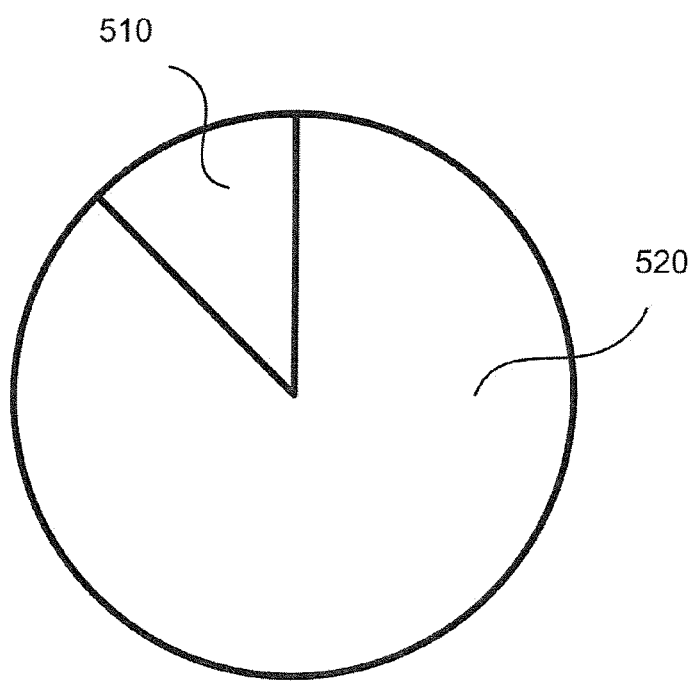

For example, if the color histogram of a first lattice cell of the input image is as illustrated in FIG. 5B, where most of the pixels of the first lattice cell are classified as belonging to the section representing the sixth level, then the number '6' is written or indicated in the first lattice cell 501, as illustrated in FIG. 5C. In this aspect, the first lattice cell is located in the lower left corner of the image, as shown in FIGS. 5A and 5C.

In the aspect shown, a color that corresponds to the sixth level is determined as a dominant color of the first lattice cell. In an aspect of the present invention colors that respectively correspond to the first through sixth levels may be determined in advance, or may be changed according to the user's preference or other conditions, such as lighting, or power consumption of the display device. In this manner, a dominant color of each of the lattice cells of the input image can be determined. In various aspects, other domain colors may be determined for the various lattice cells of the input image.

As shown in FIG. 4, the conversion domain determination module 330 determines whether one or more of the extracted dominant color account for more than a predefined percentage of the input image in operation S430. In an aspect of the present invention, the predetermined percentage may be at least n %, where n is any number.

For example, referring to a non-limiting example of FIG. 5C, zones or areas of the input image have dominant colors of the first level or the sixth level. Among them, a proportion of the area occupied by a color corresponding to the first level and the proportion of the area occupied by the color corresponding to the sixth level are determined. The results of the determination can be represented as illustrated in FIG. 5D. Referring to FIG. 5D, a first dominant color 510 is the color corresponding to the first level, and a second dominant color 520 is the color corresponding to the sixth level. In the non-limiting aspect shown, the proportion of the zone or area of the sixth level is greater than the proportion of the zone or area of the first level.

As shown in FIG. 4, if the one or more extracted dominant colors are determined to account for less than the predefined percentage of the input image in operation S430, no color conversion is performed, and the input image is output as is. Alternatively, if the one or more extracted dominant colors are determined to account for more than the predefined percentage of the input image in operation S430, a predefined default color conversion operation may be performed on the input image. The predefined default color conversion operation refers to converting the color of a pixel of the input image that is classified as belonging to a predetermined domain in a color space into a predefined color. The predefined default color conversion operation may be performed using a various methods of reproducing a preferred color. As one of the possibilities, FIG. 4 also illustrates in what situation no additional color conversion is performed.

As shown in FIG. 4, based on a determination in operation S430 that the one or more extracted dominant colors account for more than the predefined percentage of the input image, the conversion domain determination module 330 determines whether the one or more extracted dominant colors belong to a predefined conversion domain or domains, such as those illustrated in FIG. 2, in operation S440. If the extracted dominant color(s) is determined not to belong to the predefined conversion domain in operation S440, no additional color conversion is performed on the input image to output the input image as is. Alternatively, if the extracted dominant color(s) is determined to belong to the predefined conversion domain in operation S440, the predefined default color conversion operation is performed on the input image.

If the extracted dominant color is determined to belong to the predefined conversion domain in operation S440, the color conversion module 340 performs color processing on the conversion domain of the input image in operation S450. In various aspects, the conversion domain, whether predefined or not, may be based on the user's selected preferred color, and/or one that prevents or reduces distortions or a reduction of quality of the output image. In other aspects the conversion domain may be based on a proportion and/or information of an area occupied by the dominant color.

Figure 6A:
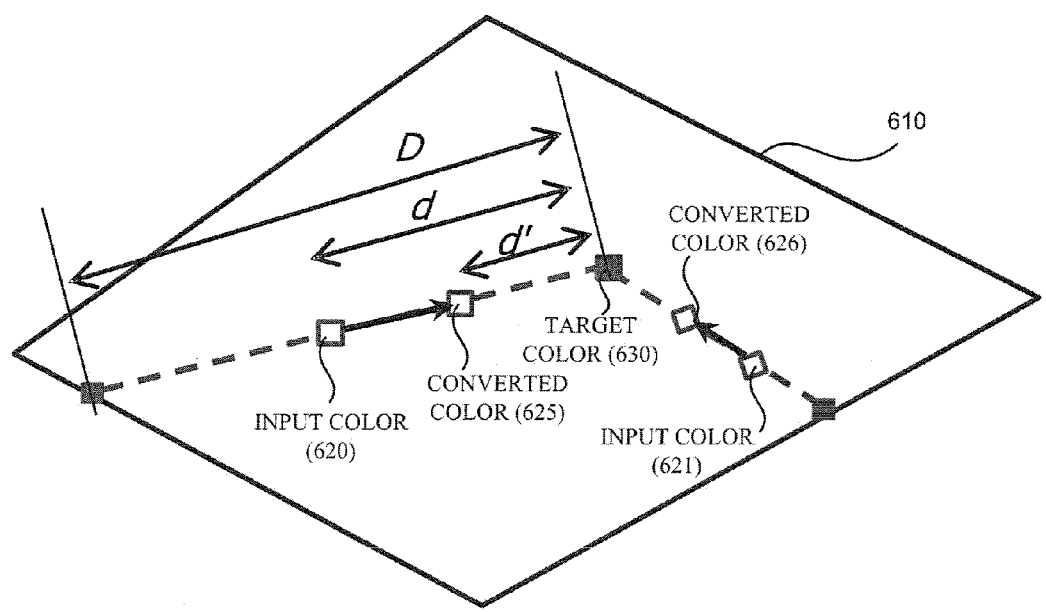
FIGS. 6A and 6B are diagrams to explain a method of performing color processing on a conversion domain according to an aspect of the present invention.
Figure 6B:
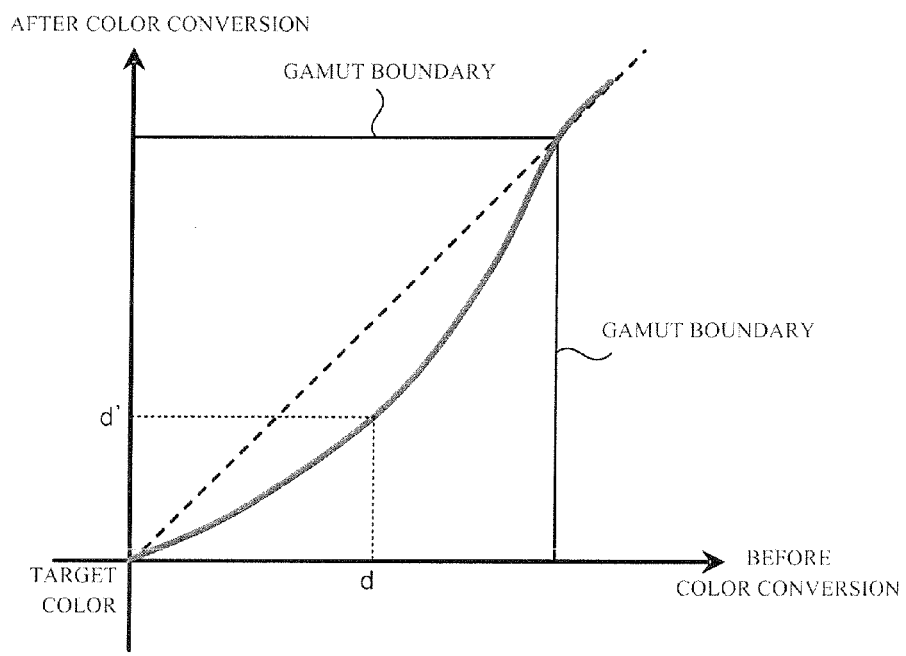

A method of performing color processing on a conversion domain will hereinafter be described in detail with reference to FIGS. 6A, 6B, and 7. FIGS. 6A and 6B are diagrams to explain a method of performing color processing on a conversion domain according to an aspect of the present invention. Referring to FIG. 6A, color processing is performed on the colors of input pixels in a gamut 610, which is defined (or shown) as a rectangle. In other aspects, the gamut 610 may be represented as other shapes, such as an ellipse or a polygon. By performing color processing, the input pixel colors 620, 621 can be moved toward (or approximate to) a target color 630, whose movement (or change) is represented as shown in FIG. 6A, and as indicated by Equation (1):

$$d' = \frac{s}{D} * d^2 + (1-s) * d \qquad (1)$$

where s is a constant between 0 and 1, d' is a value obtained by converting a color value of an input color 620 to approach the color value of a final target color 630, D is a distance from the target color 630 to the boundary of the gamut 610 along a straight line passing through input color 620, d is a distance between the input color 620 and the final target color 630 along the straight line. In the aspect shown, d' can be adjusted and/or calculated using the constant s. The constant s may be stored in advance in the parameter storage module 350 as a parameter that is used to perform the color conversion. In the aspect shown, the conversion of an input color 621 to a converted color 626 also is performed using the same Equation (1).

Referring to FIG. 6B, colors on the boundaries of the gamut 610 and the target color 630 are not converted. Instead, all other colors of pixels within the gamut 610 and the target color 630 are consecutively (or sequentially) converted from the input colors 620 into respective corresponding converted colors 625.

Figure 7:
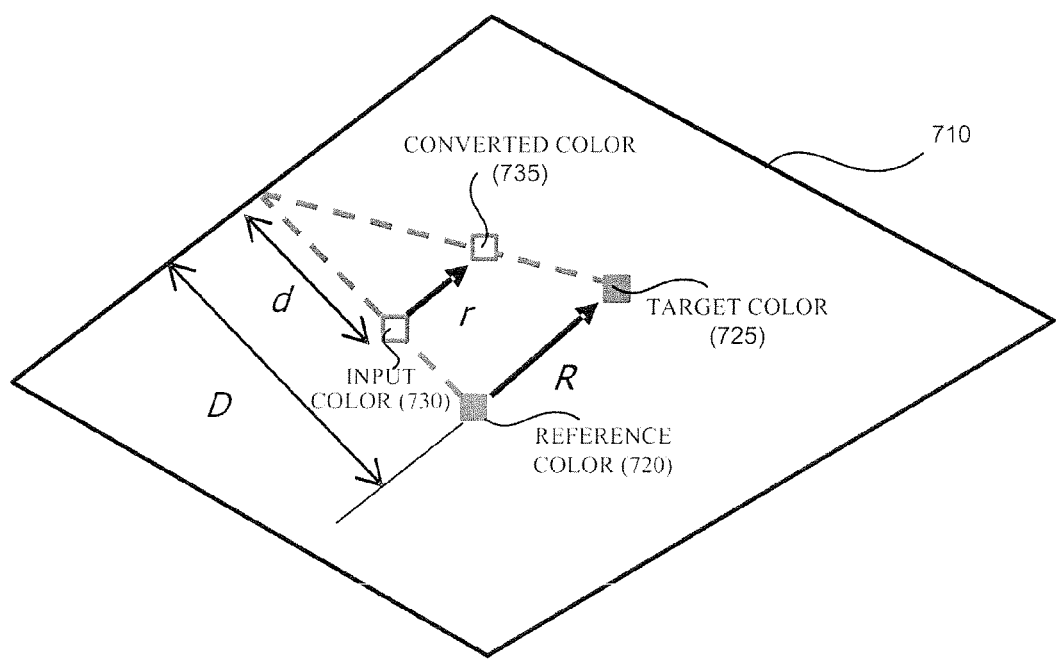
FIG. 7 is a diagram to explain a method of performing color processing on a conversion domain according to another aspect of the present invention.

FIG. 7 is a diagram to explain a method of performing color processing on a conversion domain according to another aspect of the present invention. Referring to FIG. 7, color processing is performed on the colors of input pixels in a gamut 710, which is defined (or shown) as a rectangle. In other aspects, the gamut 710 may be represented as other shapes, such as an ellipse or a polygon. By performing color processing, the input pixel colors can be approximated (or moved) along a predetermined vector direction (e.g., a direction from a reference color 720 to a target color 725), whose change or movement is as represented as shown in FIG. 7, and as indicated by Equation (2):

$$D:d=|\vec{R}|:|\vec{r}|$$

$$\vec{P}'=\vec{P}+\vec{r} \qquad (2)$$

where $\vec{P}$ indicates an input color 730, $\vec{P}'$ indicates a color 735 obtained by performing color conversion on the input color 730, D is a distance from the reference color 720 to the boundary of the gamut 710 along a straight line passing through input color 730, d is a distance between the input color 730 and the boundary of the gamut 710 along the same straight line, R is the straight-line distance from the reference color 720 to the target color 725, and r is the straight-line distance from the input color 730 to the converted color 735.

According to an aspect of the present invention, color conversion is not performed on colors on gamut boundaries, to thereby achieve a natural appearing color conversion.

A color processing can be performed on a conversion domain using a method disclosed in Korean Patent Laid-Open Gazette No. 10-2004-0053500 (published on 24 of Jun. 2004), and corresponding to U.S. Patent Application Publication No. 2004/0114798, for example, the disclosure of which is incorporated herein by reference.

Techniques of properly converting memory colors, such as skin tones, grass color (or green), and sky color (or blue), with which users are familiar with, and accent colors, such as strong (or bright) red and strong (or bright) yellow, into colors preferred by users, are extremely important to enhance the quality of images displayed by a display device.

It is important to properly reproduce both the memory colors and the accent colors. However, users tend to perceive even a slight error in the reproduction of the memory colors as a severe deterioration in the picture quality, while the effect of reproduction of the accent colors, such as red and yellow, can only become apparent when an object having an accent color is displayed to occupy most of the screen.

Figure 8:
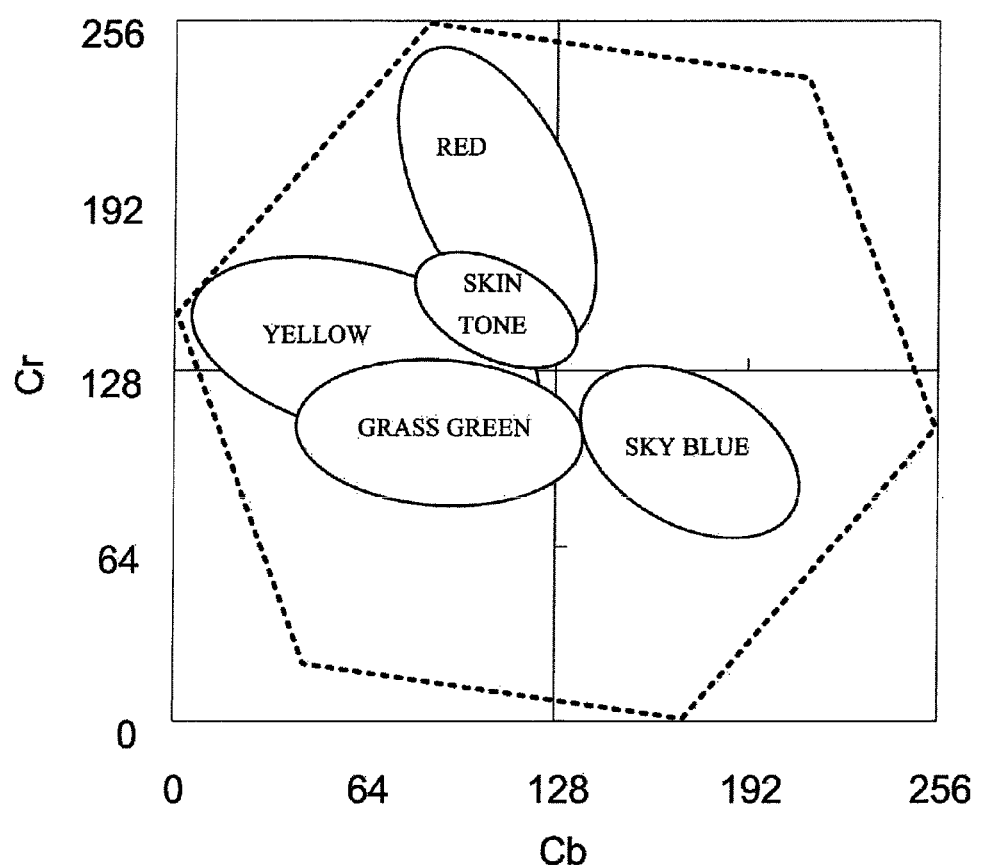
FIG. 8 is a diagram to explain a method of reproducing a preferred color according to another aspect of the present invention.

FIG. 8 is a diagram to explain a method of reproducing a preferred color according to another aspect of the present invention. Referring to FIG. 8, memory color domains and accent color domains overlap one another, to thereby cause a problem in a related method of reproducing a preferred color. The problem with the related method and/or other problems can be addressed by the method of an aspect of the present invention.

According to an aspect of the present invention as discussed above, a dominant color in an input image is detected. Then, if the detected dominant color is an accent color, accent color conversion may be performed. On the other hand, if the detected dominant color is not an accent color, memory color conversion may be performed. Accent and memory color conversions will be described in further detail with reference to FIG. 9.

Figure 9:
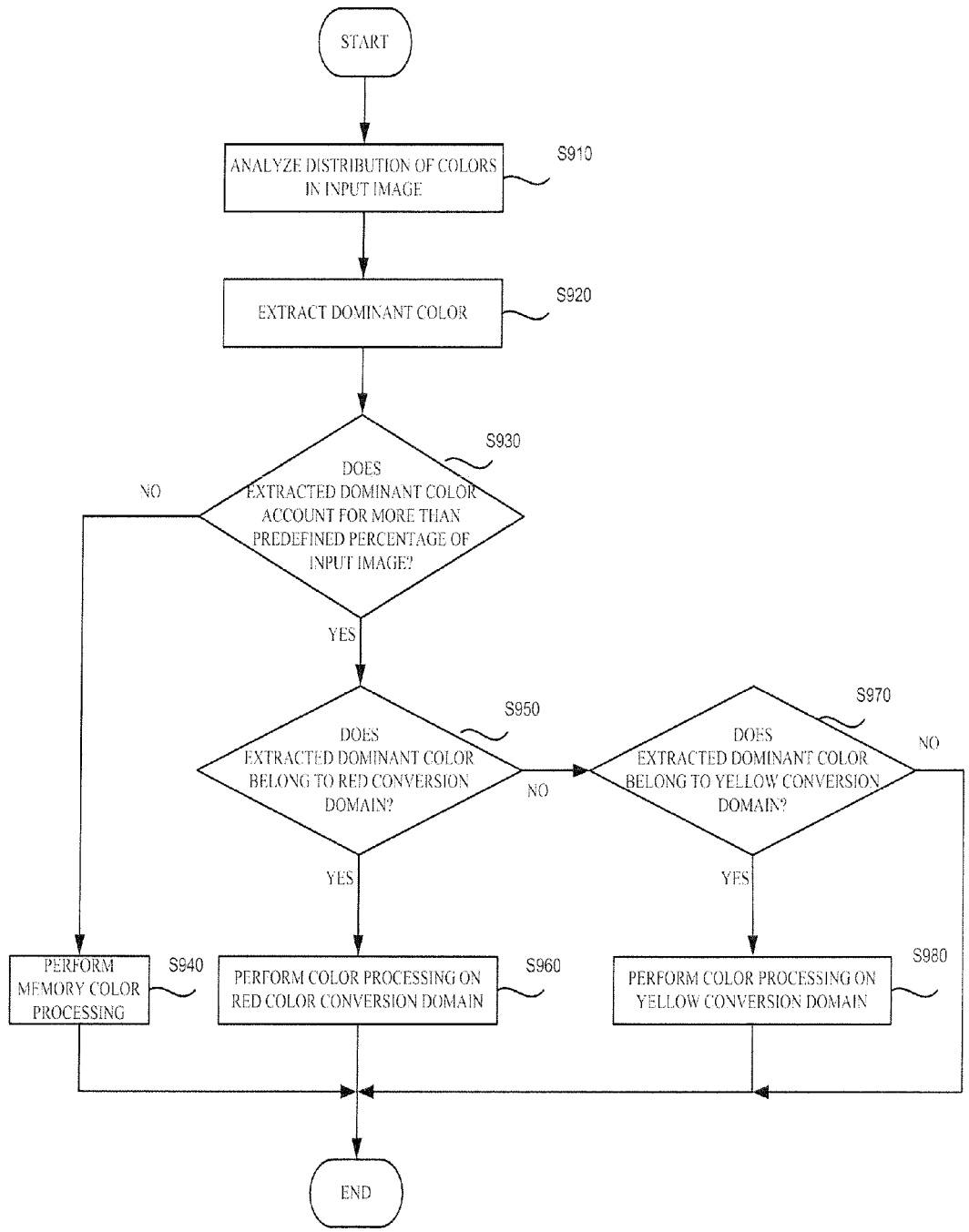
FIG. 9 is a flowchart illustrating a method of reproducing a preferred color according to another aspect of the present invention.

FIG. 9 is a flowchart illustrating a method of reproducing a preferred color according to another aspect of the present invention. Referring to FIG. 9, the color distribution analysis module 310 analyzes the distribution of colors in an input image in operation S910. The dominant color extraction module 320 also extracts a dominant color from the input image according to the results of the performed analysis in operation S920. The conversion domain determination module 330 also determines whether the extracted dominant color accounts for more than a predefined percentage (e.g., N %) of the input image in operation S930. In the aspect shown, operations S910 through S930 are respectively the same as operations S410 through S430 as illustrated in FIG. 4.

Referring to FIG. 9, if the extracted dominant color is determined to account for less than the predefined percentage of the input image in operation S930, the color conversion module 340 performs color processing on a memory color conversion domain in operation S940. However, if the extracted dominant color is determined to account for more than the predefined percentage of the input image in operation S930, the conversion domain determination module 330 determines whether the extracted dominant color belongs to a red conversion domain such as that illustrated in FIG. 8, in operation S950. If the extracted dominant color is determined to belong to the red conversion domain in operation S950, the color conversion module 340 performs color processing on the red conversion domain in operation S960.

On the other hand, if the extracted dominant color is determined to not belong to the red conversion domain in operation S950, the conversion domain determination module 330 determines whether the extracted dominant color belongs to a yellow conversion domain such as that illustrated in FIG. 8, in operation S970. If the extracted dominant color is determined to belong to the yellow conversion domain in operation S970, the color conversion module 340 performs color processing on the yellow conversion domain in operation S980.

If the extracted dominant is determined to not belong to the yellow conversion domain in operation S970, no additional color processing is performed on the input image, and the display module 360 outputs the input image as is. An aspect of a method of performing color processing on the red conversion domain or the yellow conversion domain is as referred to in the description of operation S450 illustrated in FIG. 4. Although discussed in terms of red and/or yellow dominant color and certain memory colors, other dominant colors and/or memory colors are within the scope of the present invention.

Figure 10:
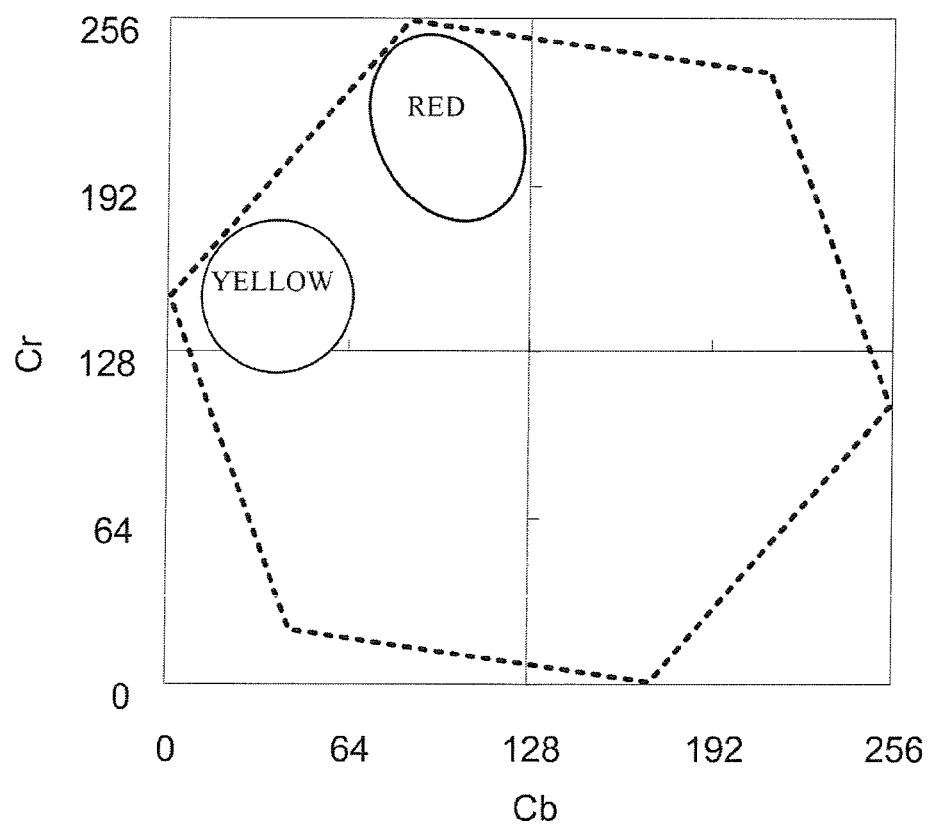
FIG. 10 is a diagram to explain accent color domains that are used to determine a conversion domain according to an aspect of the present invention.

According to an aspect of the present invention, an accent color domain that is used by the conversion domain determination module 330 to determine a conversion domain may only comprise high-chroma colors, as illustrated in FIG. 10, though not required. Therefore, it is possible to minimize the probability or the possibility of a memory color, such as a skin tone or grass color, from being mistaken as an accent color, and to maximize the effect of color conversion by performing preferred color conversion only when a high-chroma accent color is encountered.

The term 'module', as used herein, refers to, but is not limited to, a software or hardware component, such as a Field Programmable Gate Array (FPGA) or Application Specific Integrated Circuit (ASIC), which performs certain tasks. A module may advantageously be configured to reside on an addressable storage medium and configured to execute on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules.

According to aspects of the present invention, it is possible to prevent or reduce distortion of an output image or deterioration of the quality of the output image even if a plurality of conversion domains to obtain preferred colors that overlap one another in a color space.

In one or more aspects, various components of the apparatus 300, as shown in FIG. 3, such as the color distribution analysis module 310, the dominant color extraction module 320, the conversion domain determination module 330, and the color conversion module 340 can be integrated into a single control unit or processor, or alternatively, can be implemented in software or hardware, such as, for example, a field programmable gate array (FPGA), or an application specific integrated circuit (ASIC). As such, it is intended that the processes described herein be broadly interpreted as being equivalently performed by software, hardware, or a combination thereof.

In various aspects the apparatus to reproduce a preferred color may be included in display device, a cell phone, a personal digital assistant (PDA), a portable multimedia player, and/or other mobile electronic devices.

Although a few aspects of the present invention have been shown and described, it would be appreciated by those skilled in the art that changes may be made in the aspects without departing from the principles and spirit of the invention, the scope of which is defined in the claims and their equivalents.

What is claimed is:

1. An apparatus to reproduce a preferred color, the apparatus comprising:
    a color distribution analysis module to analyze a distribution of colors from at least one lattice cell in an input image;
    a dominant color extraction module to extract a dominant color from the at least one lattice cell according to a result of the analysis;
    a conversion domain determination module to determine a single conversion domain from a predefined conversion domain or domains, to be processed in a color space, if the extracted dominant color accounts for more than a threshold percentage of the input image; and
    a color conversion module to convert the colors in the input image that belong to the determined single conversion domain,
    wherein the color conversion module converts the colors that belong to the single conversion domain so that the colors can be approximated to a target color, and the single conversion domain comprises the extracted dominant color that accounts for more than the threshold percentage of the input image.

2. The apparatus of claim 1, wherein the dominant color is a color that represents each zone in the input image.

3. The apparatus of claim 1, wherein the conversion domain determination module determines the single conversion domain based on information of an area occupied by the dominant color.

4. The apparatus of claim 1, wherein the color conversion module does not convert colors on boundaries of the conversion domain and the color of the target color but consecutively converts all other colors in the conversion domain.

5. The apparatus of claim 1, wherein the color conversion module converts the colors that belong to the single conversion domain so that the colors are convertible to converted colors based on a vector from a reference color to a target color.

6. A method of reproducing a preferred color, the method comprising:
    analyzing a distribution of colors from at least one lattice cell in an input image and extracting a dominant color from at least one lattice cell according to a result of the analysis;
    determining a single conversion domain from a predefined conversion domain or domains, to be processed in a color space, if the extracted dominant color accounts for more than a threshold percentage of the input image; and
converting the colors in the input image that belong to the determined single conversion domain,
wherein the converting the colors comprises converting the colors that belong to the single conversion domain so that the colors can be approximated to a target color, and the single conversion domain comprises the extracted dominant color that accounts for more than the threshold percentage of the input image.

7. The method of claim 6, wherein the dominant color is a color that represents each zone in the input image.

8. The method of claim 6, wherein the single conversion domain is determined based on information of an area occupied by the dominant color.

9. The method of claim 6, wherein the converting of the colors further comprises not converting colors on boundaries of the conversion domain and the color of the target color but consecutively converting all other colors in the conversion domain.

10. The method of claim 6, wherein the converting of the colors comprises converting the colors that belongs to the single conversion domain so that the colors can be converted to converted colors based on a vector from a reference color to a target color.

11. A method of reproducing a preferred color, the method comprising:
analyzing a distribution of colors from at least one lattice cell in an input image and extracting a dominant color from the at least lattice cell according to a result of the analysis;
determining whether the extracted dominant color accounts for more than a threshold percentage of the input image;
selecting a single conversion domain regarding an accent color if the extracted dominant color is determined to account for more than the threshold percentage of the input image and selecting a single conversion domain regarding a memory color otherwise; and
converting the colors in the input image that belong to the selected single conversion domain of one of the accent color or the memory color,
wherein the converting the colors comprises converting the colors belonging to the selected single conversion domain so that the colors can be approximated to a target color, and the single conversion domain comprises the extracted dominant color that accounts for more than the threshold percentage of the input image.

12. The method of claim 11, wherein the determining of the extracted dominant color comprises determining whether the extracted dominant color accounts for more than a threshold percentage of the input image with reference to information indicating an area occupied by the extracted dominant color.

13. The method of claim 11, wherein the accent color is red or yellow.

14. The method of claim 11, wherein the memory color conversion domain and the accent color conversion domain partially overlap each other.

15. The method of claim 11, wherein the converting of the colors further comprises not converting colors on boundaries and the color of the target color of the selected conversion domain but consecutively converting all other colors of the selected conversion domain.

16. The method of claim 11, wherein the converting of the colors comprises converting the colors that belong to the selected conversion domain so that the colors can be converted to converted colors based on a vector from a reference color to a target color.

17. A color reproducing method of a display, comprising:
determining a dominant color of at least one lattice cell in an input image based on an arrangement of colors of the at least one lattice cell; and
selectively converting colors of a single conversion domain from a predefined conversion domain or domains, of the input image relative to a target color, wherein the single conversion domain corresponds to the dominant color and is represented in a color space,
wherein the selectively converting colors comprises converting the colors belonging to the selected single conversion domain so that the colors can be approximated to a target color, and the single conversion domain comprises the extracted dominant color that accounts for more than the threshold percentage of the input image.

18. The color reproducing method of claim 17, wherein the determining of the dominant color further comprises:
delineating an input image into a plurality of zones containing a plurality of pixels;
obtaining a distribution of color information of the plurality of pixels over a plurality of color levels for each zone;
determining the dominant color of each zone based on a distribution frequency of the color information over the plurality of color levels; and
determining the dominant color of the input image based on a distribution of the dominant colors of the plurality of zones.

19. The color reproducing method of claim 18, wherein the single conversion domain corresponds to one of a memory color or an accent color, and the selectively converting of the colors further comprises determining whether to convert the colors corresponding to the single conversion domain of one of the memory color or the accent color.

20. The color reproducing method of claim 18, wherein the conversion domain comprises high-chroma colors to avoid conversion of the accent colors as memory colors.

21. The color reproducing method of claim 20, wherein the colors are converted using the equation $$d' = \frac{s}{D} * d^2 + (1-s) * d$$

where s is a constant between 0 and 1, d' is a value obtained by converting a color value of one of the colors to approach a color value of the target color, D is a distance from the target color to a boundary of a gamut of the color space along a straight line passing through the one of the colors, d is a distance between the one of the colors and the target color along the straight line.

22. The color reproducing method of claim 20, wherein the colors are converted using the equation $$D:d = |\vec{R}| : |\vec{r}|$$

$$\vec{P}' = \vec{P} + \vec{r}$$

where $\vec{P}$ indicates one of the colors, $\vec{P}'$ indicates a color obtained by performing the color conversion on the one of the colors, D is a distance from a reference color to a boundary of a gamut along a straight line passing through the one of the colors, d is a distance between the one of the colors and the boundary of the gamut along the same straight line, R is the straight-line distance from the reference color to the target color, and r is the straight-line distance from the one of the colors to the converted color.

23. A color reproducing apparatus of a display, comprising:
a processor to determine a dominant color of at least one lattice cell in an input image based on an arrangement of colors of the at least one lattice cell, and to selectively convert colors of a single conversion domain from a predefined conversion domain or domains, of the input image relative to a target color, wherein the single conversion domain corresponds to the dominant color and is represented in a color space, and to output the input image having the converted colors; and
a display to display the input image having the converted colors,
wherein the selectively converting colors comprises converting the colors belonging to the selected single conversion domain so that the colors can be approximated to a target color, and the single conversion domain comprises the extracted dominant color that accounts for more than the threshold percentage of the input image.

24. The color reproducing apparatus of a display of claim 23, wherein the processor delineates an input image into a plurality of zones containing a plurality of pixels, obtains a distribution of color information of the plurality of pixels over a plurality of color levels for each zone, determines the dominant color of each zone based on a distribution frequency of the color information over the plurality of color levels, and determines the dominant color of the input image based on a distribution of the dominant colors of the plurality of zones.

25. The color reproducing apparatus of a display of claim 24, wherein the conversion domain corresponds to one of a memory color or an accent color, and the selectively converting of the colors further comprises determining whether to convert the colors corresponding to the conversion domain of one of the memory color or the accent color.

26. The color reproducing apparatus of a display of claim 25, wherein the conversion domain comprises high-chroma colors to avoid conversion of the accent colors as memory colors.

27. The color reproducing apparatus of a display of claim 25, wherein the processor converts the colors using the equation $$d' = \frac{s}{D} * d^2 + (1-s) * d$$

where s is a constant between 0 and 1, d' is a value obtained by converting a color value of one of the colors to approach a color value of the target color, D is a distance from the target color to a boundary of a gamut of the color space along a straight line passing through the one of the colors, d is a distance between the one of the colors and the target color along the straight line.

28. The color reproducing apparatus of a display of claim 25, wherein the processor converts the colors using the equation $$D:d = |\vec{R}| : |\vec{r}|$$

$$\vec{P}' = \vec{P} + \vec{r}$$

where $\vec{P}$ indicates one of the colors, $\vec{P}'$ indicates a color obtained by performing the color conversion on the one of the colors, D is a distance from a reference color to a boundary of a gamut along a straight line passing through the one of the colors, d is a distance between the one of the colors and the boundary of the gamut along the same straight line, R is the straight-line distance from the reference color to the target color, and r is the straight-line distance from the one of the colors to the converted color.

* * * * *

UNITED STATES PATENT AND TRADEMARK OFFICE
CERTIFICATE OF CORRECTION

| | |
|---|---|
| PATENT NO. | : 8,254,673 B2 |
| APPLICATION NO. | : 11/837879 |
| DATED | : August 28, 2012 |
| INVENTOR(S) | : Young-shin Kwak et al. |

It is certified that error appears in the above-identified patent and that said Letters Patent is hereby corrected as shown below:

On the Title Page,

Column 2, References cited Item [56] (Other Publications), Line 4, Delete "207," and insert -- 2007, --, therefor.

Signed and Sealed this
Fourth Day of November, 2014

Michelle K. Lee
*Deputy Director of the United States Patent and Trademark Office*